United States Patent [19]
Ford et al.

[11] Patent Number: 5,578,203
[45] Date of Patent: Nov. 26, 1996

[54] SYSTEM TO CLARIFY SOLIDS BURDENED LIQUID AND RECIRCULATE IT TO USE IN CONTINUOUS FLOW

[75] Inventors: Steven D. Ford, Clovis; Eddie Fox, Fresno, both of Calif.; Lee Haslup, Dunwoody, Ga.; Phil Pelletier, Bel Air, Md.

[73] Assignee: Claude Laval Corporation, Fresno, Calif.

[21] Appl. No.: 372,199

[22] Filed: Jan. 11, 1995

[51] Int. Cl.$^6$ .............................. B01D 21/26; B01D 21/24
[52] U.S. Cl. ................. 210/168; 210/194; 210/195.1; 210/257.1; 210/295; 210/297; 210/360.1
[58] Field of Search ...................................... 210/805, 194, 210/195.1, 167, 168, 257.1, 295, 297, 360.1

[56] References Cited

U.S. PATENT DOCUMENTS

| | | | |
|---|---|---|---|
| 4,636,317 | 1/1987 | Lewis | 210/787 |
| 4,772,402 | 9/1988 | Love | 210/805 |
| 4,773,992 | 9/1988 | Dietrick et al. | 210/295 |
| 5,047,157 | 9/1991 | Hoffman et al. | 210/787 |
| 5,062,963 | 11/1991 | Marcinkowski et al. | 210/805 |
| 5,344,570 | 9/1994 | McLachan et al. | 210/805 |
| 5,380,446 | 1/1995 | Bratten | 210/805 |
| 5,399,262 | 3/1995 | Hawkins et al. | 210/512.1 |

*Primary Examiner*—David A. Reifsnyder
*Attorney, Agent, or Firm*—Donald D. Mon

[57] ABSTRACT

A system which clarifies a solids-burdened liquid stream from a user device such as a machine tool and returning it clarified to the user device. A tank receives the burdened liquid stream in a first of two regions from which a first centrifugal separator draws. It discharges its clarified stream through an inductor into the second of said regions, said regions being continuously connected. A second centrifugal separator draws from said second region and returns its clarified liquid to the user device. Both separators discharge their solids to collectors.

4 Claims, 1 Drawing Sheet

SYSTEM TO CLARIFY SOLIDS BURDENED LIQUID AND RECIRCULATE IT TO USE IN CONTINUOUS FLOW

FIELD OF THE INVENTION

A continuous flow liquid clarifying system which removes solid burden from a liquid stream received from a user device and recirculates the clarified liquid to the user device.

BACKGROUND OF THE INVENTION

The continuous supply of a coolant to the interface of a cutting tool and a workpiece in a machine tool is a single example of a situation where the supply of a liquid must be reliable as to clarity and continuity. The term "clarity" is used herein to denote a liquid which is sufficiently free from solid material that it can safely and effectively be applied to a user device without damage, for example as a coolant supplied to the interface of a workpiece and a cutting tool.

At first glance this would seem to be a simple matter, but in fact it is quite complicated. Metal cutting operations require coolants not only sufficient to cool and lubricate the tool-workpiece interface, but also to flush away the cuttings. While some cuttings such as turnings can be screened out, others such as chips and smaller particulates cannot be, at least to the extent that the coolant can immediately be recirculated to the interface. Beyond this, such systems tend to be subject to sludge build-up with its accompanying odors and the resulting need to dump the coolant from time to time. Disposal of coolant is an increasing economic burden.

A practical continuous flow system cannot work without a surge tank which can accommodate occasional abrupt increases and decreases in demand. Also, machine tools cannot tolerate interruptions in the supply of coolants, because the part being manufactured is likely to be adversely affected. Especially in shops where there are many tools, the trend is to provide a central coolant supply and plumb the machines to it. This is cumbersome and expensive.

It is an object of this invention to provide a coolant system which can be utilized by only one, or by many machine tools, in which a coolant to be recirculated is suitably and continuously clarified, and in which there is no build-up of sludge or particulates, these being continuously removed in a system wherein the total volume of the coolant is kept "live".

BRIEF DESCRIPTION OF THE INVENTION

A system according to this invention includes a tank, and a pair of centrifugal separators. These separators receive burdened liquid through a respective intake port, spin the liquid centrifugally, and discharge separated solids through a respective solids exit port, and clarified liquid through a respective liquid exit port.

In this system, burdened liquid from a point of use such as a machine tool is discharged into the tank in a first region therein. A first of said separators receives burdened liquid from this region into its intake port. Its solids exit port discharges to a collector. Its liquids exit port discharges to a second region in said tank.

The intake port of the second separator draws lesser-burdened liquid from said second region, much of which was previously clarified by the first separator. Its solids exit port discharges to a solids collection device, preferably but not necessarily disposed in said tank. Its liquids exit port discharges to the point of use.

The first separator may conveniently be regarded as a first-stage separator, and the second separator as a polishing separator.

According to a feature of this invention, the clarified liquid from the first separator is discharged into the tank near the bottom of the second region where it is directed toward the first region. It is discharged through a plurality of eductors. These eductors augment the flow of liquid, and inject the resulting liquid in a smooth, non-turbulent stream which tends to move solid material and sludge near the bottom of the tank toward the first region where it will be attracted to the intake of the first separator.

The concentration of solids in the first region is greater than in the second region, because it includes the raw infeed from the machine tool. The second region contains mainly the clarified liquid from the first separator, plus such small amount of solids as may have migrated into it. As a consequence, the solids load presented to the second separator is much more dilute, and the polishing separation will be better than the first, because it is not impeded by the burden of the larger particles.

The above and other features of this invention will be fully understood from the following detailed description and the accompanying drawings, in which:

DETAILED DESCRIPTION OF THE INVENTION

Figure 1:
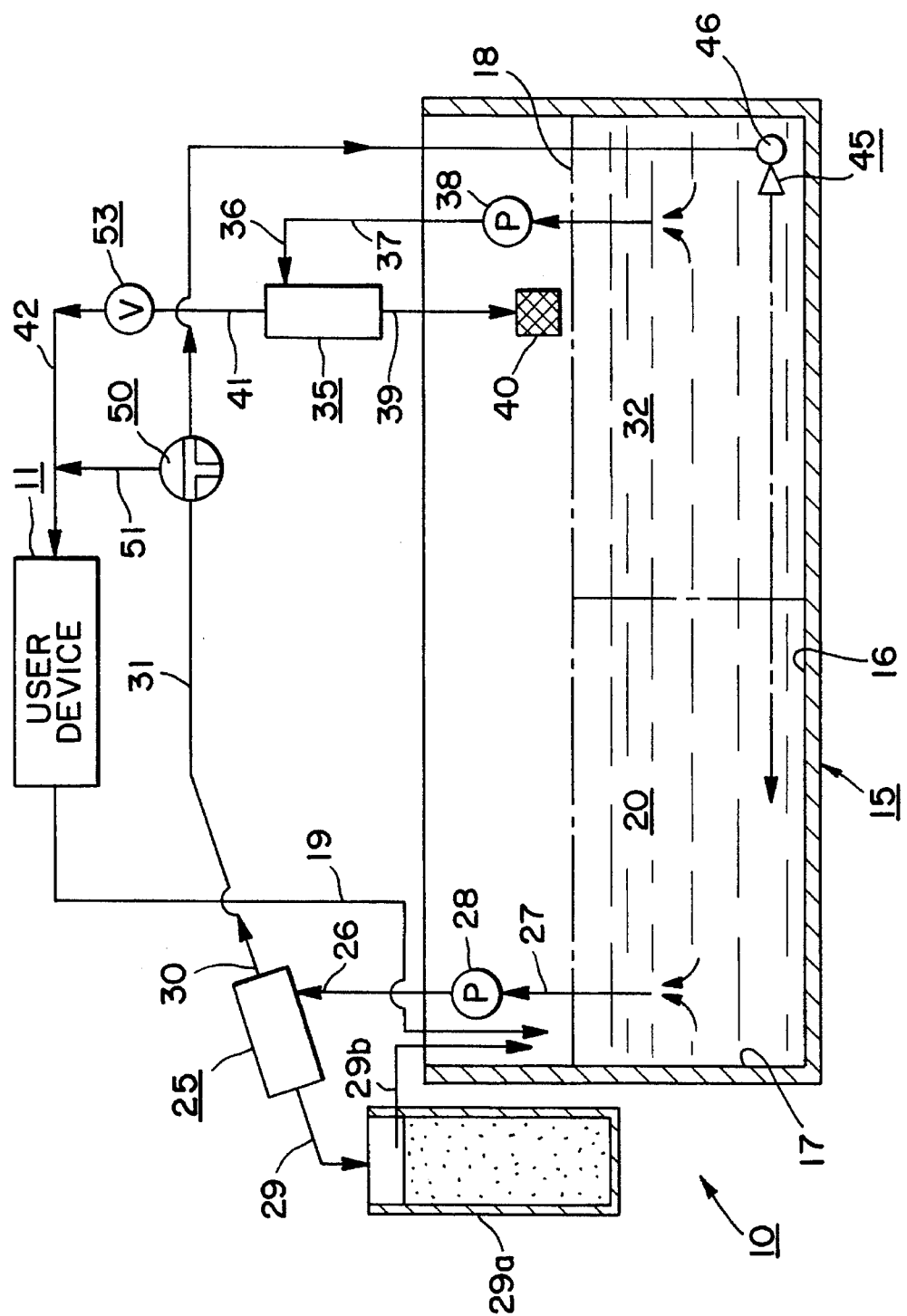
FIG. 1 is a system diagram partly in schematic rotation, showing the presently-preferred embodiment of the invention.

The presently-preferred clarifying system 10 according to this invention is shown FIG. 1. Its objective is to provide a continuous and reliable stream of clarified liquid to a user device 11. The most important user device for this invention at the present time is a metal cutting machine tool, such as a lathe, mill or grinder. There are, of course other cutting machines, and applications other than machine tools. Therefore this example is not intended to be a limitation on the scope or utility of the invention.

A tank 15 has a bottom 16 and a peripheral side wall 17. It contains a volume of liquid 18. The bottom will usually be flat. Instead it may be contoured to enhance the desired flow patterns in the tank.

An infeed conduit 19 conveys solids-burdened liquid from the user device, and discharges it into a first region 20 in the tank. Generally this region will be at one end of the tank.

A first centrifugal separator 25 has an inlet port 26 supplied through an inlet conduit 27 fed by a pump 28. Pump 28 draws solids burdened liquid from the first region and impels it to inlet port 26. This feed to the first separator carries a heavy burden of solids such as turnings, chips, and grindings.

Separator 25 separates much of the burden from its feed. It has a solids exit port 29 that discharges the solids into a collector 29a such as a drum or other container for later disposal. A decant conduit 29b drains supernatant liquid from the collector into the tank. The solids settle to the bottom of the collector.

Separator 25 has a liquids exit port 30 which passes clarified liquid through a discharge conduit 31. Conduit 31 discharges this clarified liquid into second region 32 in the tank. The second region is at the opposite end of the tank from the first region. There is no defined interface between these regions. In fact there is substantial flow between them. However, as will be seen, the second region will have a much lesser solids burden than the first region.

A second separator 35 has an inlet port 36 supplied through an inlet conduit 37, fed by a pump 38. Pump 38 draws liquid from the second region and impels it to liquids inlet port 36. This feed to the second separator carries a much lesser load of solids than the feed to the first separator, because most of the solids burden has already been removed by the first separator. However, some fine material will not have been removed, and some larger material will have migrated into the second region. Even so, because of the lesser burden, it is readily possible to achieve polishing (clarification) of the liquid to sizes no larger than about 20 microns, which results in a very suitable coolant for a machine tool.

Second separator 35 has a solids exit port 39 which discharges its solids into a collection bag 40. Because the burden is so light, this collection device can conveniently be placed in the tank, either above or underneath the liquid level. The preponderant portion of the solids burden will have been removed by the first separator. And the collector bag needs to be removed and replaced, or emptied infrequently.

Second separator 35 has a liquids exit port 41 which passes clarified liquid through a discharge conduit 42, which is also the supplying conduit for the user device. This completes the loop.

The supply of liquid from the first separator to the second region in the tank is not intended to be turbulent, although it is not quiescent, either. The objective is to reduce as much as practical the migration of solids from the first region to the second region. Obviously there will be some, but best results are attained when it is minimized. The contents of the tank are intended to be "live" in the sense that material such as particles and sludge which tend to sink to the bottom are kept in motion toward the first region so as to be removed by the first separator. It is not intended to stir up the tank so as to cause undue mixing between the two regions.

For this purpose, the discharge conduit 31 does not discharge through nozzles, but rather through eductor 45 whose output is intended to be a steady smooth stream directed along the bottom of the tank from the second region into the first region. Conveniently, a plurality of eductors can discharge from a single manifold 46.

An eductor is a well-known hydraulic device in which the flow of liquid through a throat draws in from the tank a quantity of liquid which is added to the main stream, thereby increasing the volume of flow so as to enhance the sweeping action of the stream from the eductors. This is a preferred arrangement, although other means to produce a smooth flow of liquid along the bottom may be used instead.

Both centrifugal separators are of the type exemplified by Laval U.S. Pat. No. 5,368,735, which is incorporated in its entirely herein by reference for its showing of such a separator. These separators are exemplified by a cylindrical separation chamber into which a burdened liquid stream is tangentially injected. As the stream swirls along the cylindrical wall in a helical path, the solids are displaced radially, and move to an exit port. The clarified liquid reverses its direction in a vortex motion, and exits the separator at the other end. These are well-known separators which do not require further disclosure here in order to understand this invention.

Another advantage of this system is that it can be kept in steady flow when one of the separators is taken out of service for repair. A suitably clarified liquid stream will be created by either one of the separators, although not to the higher degree of clarity created when both are in operation.

For this purpose, a selector valve 50 is plumbed into conduit 31, selectively connecting liquid exit port 30 of first separator 25 to a diversion conduit 51 that connects to conduit 42, and thereby to the input of the user device. Valve 51 has settings which permit straight-through flow in conduit 31, divert flow through conduit 51, or shut off. A block valve 53 having selectively open and shut settings is plumbed in conduit 42.

When first separator 25 is to be removed for servicing, valve 50 will be closer. Second separator 35 continues to run. When second separator 35 is to be serviced, valve 53 will be closed, and selector valve 50 will be set to supply liquid to the user device through conduit 51.

This system provides important advantages over arrangements that could at first glance appear to be equivalent in function. For example, assume that instead of discharging both the raw infeed and the clarified liquid from the first separator into the same tank, the clarified liquid would be discharged into a separate tank from which the second separator would draw its feed. This would indeed clarify the liquid as the consequence of passage through two separators.

However, both tanks will have stagnant regions. Experience has shown that sludge will gradually be deposited, and the bacterial action will begin. Soon the system becomes malodorous and must be shut down and purged. Machine time will be lost, and coolant will unnecessarily be wasted.

Coolant is not readily disposed of. It is often regarded as a hazardous substance, and to dispose of it is costly. It is a considerable saving not to purge the entire system merely to be rid of sludge, which these separators can readily attend to.

Furthermore, suppose that one of the separators must be shut down? This will interrupt flow to the user device. Again there will be downtime or damage to the parts.

With the instant invention, both separators can be plumbed to the user device. Should one separator be shut down, the other can remain in service. Either can supply a liquid which is suitably clarified.

This system can be made small enough to be affordable for a single machine. Optimally it can be made larger, and can serve a plurality of machines. Importantly, the supply of liquid is assured, and the system will remain live and free from the maintenance so often required because of sludge build-up.

This invention is not to be limited by the embodiment shown in the drawings and described in the description, which is given by way of example and not of limitation, but only in accordance with the scope of the appended claims.

I claim:

1. A system for clarifying a solids-burdened liquid stream, received from a user device and returning it clarified to said user device, comprising:

a tank having a bottom, a peripheral side wall, a first region and a second region, said regions being contiguous to and continuous with one another, without obstruction to flow between them;

a first centrifugal separator;

a second centrifugal separator; each said separator having an inlet port, a solids exit port, and a liquids exit port;

a feed conduit for discharging solids-burdened liquid from said user device into said first region;

an inlet port conduit from said first region to the inlet port of said first separator;

first pump means in said inlet port conduit;

a discharge conduit from the liquids exit port of said first separator to said second region;

collector means receiving solids from the solids exit port of said first separator;

a feed conduit from said second region to said inlet port of said second separator;

second pump means in said feed conduit;

a discharge conduit from said liquids exit port of said second separator to said user device;

collector means receiving solids from the solids exit port of said second separator; and eductor means receiving liquid from the discharge from said first separator, said eductor means discharging said liquid into said second region along the bottom of the tank in a sweeping flow from the second region into the first region, whereby to sweep settled solids from said second region into said first region for the purpose of their being removed from the liquid by said first separator.

2. A system according to claim 1 in which said collector means from said second separator is a filter bag disposed in said tank.

3. A system according to claim 1 in which a diversion conduit is connected between said discharge conduit from said first separator, and said discharge conduit from said second separator, and in which a selector valve enables flow selectibly through said discharge conduit from said first separator to said tank, or to said diversion conduit to enable supply of liquid to said user device from said first separator when said second separator is disabled.

4. A system according to claim 3 in which said selector valve also includes a selectable setting which prevents any flow through it, and in which an open-closed valve is connected in said discharge conduit from said second separator.

* * * * *